(12) United States Patent
de la Iglesia

(10) Patent No.: US 9,244,861 B2
(45) Date of Patent: Jan. 26, 2016

(54) EFFICIENT CACHING SYSTEM

(71) Applicant: Violin Memory Inc., Santa Clara, CA (US)

(72) Inventor: Erik de la Iglesia, Santa Clara, CA (US)

(73) Assignee: VIOLIN MEMORY INC., Santa Clara, CA (US)

( * ) Notice: Subject to any disclaimer, the term of this patent is extended or adjusted under 35 U.S.C. 154(b) by 210 days.

(21) Appl. No.: 14/079,534

(22) Filed: Nov. 13, 2013

(65) Prior Publication Data

US 2015/0134915 A1    May 14, 2015

(51) Int. Cl.
*G06F 12/00* (2006.01)
*G06F 12/12* (2006.01)
*G06F 12/08* (2006.01)
*G06F 12/02* (2006.01)

(52) U.S. Cl.
CPC .............. *G06F 12/122* (2013.01); *G06F 12/02* (2013.01); *G06F 12/0802* (2013.01); *G06F 12/0871* (2013.01)

(58) Field of Classification Search
CPC .............................. G06F 12/02; G06F 12/0802
See application file for complete search history.

(56) References Cited

U.S. PATENT DOCUMENTS 6,678,795 B1 * 1/2004 Moreno et al. ................ 711/137

* cited by examiner

*Primary Examiner* — Shawn X Gu
(74) *Attorney, Agent, or Firm* — Brinks Gilson & Lione

(57) ABSTRACT

Cluster data is generated based on a history of storage operations. The cluster data may include an address range and an access history. The access history may comprise a bit pattern that represents a history of storage operations associated with a cluster. A prefix or counter may identify the number of storage operations identified in the bit pattern. The bit pattern and/or address range may be updated to reflect new storage operations associated with the cluster. The bit pattern then may determine when to cache data in a cache memory.

22 Claims, 8 Drawing Sheets

EXISTING ACCESS HISTORY 440A

NEW ACCESS HISTORY 440B

| INPUT STREAM 300 | ADDRESS RANGE 420 | ACCESS HISTORY 440 | CLUSTER |
|---|---|---|---|
| (302A) TIME A, READ 50-70 | 50-70 | 00000.....10 | 400A, 420A, 440A |
| (302B) TIME B, READ 120-140 | 120-140 | 00000.....10 | 400B, 420B, 440B |
| (302C) TIME C, READ 350-370 | 350-370 | 00000.....10 | 400C, 420C, 440C |
| (302D) TIME D, READ 140-160 | 120-160 | 00000.....10 | 400D, 420D, 440D |
| (302E) TIME E, READ 70-90 | 50-90 | 00000.....10 | 400E, 420E, 440E |
| (302F) TIME F, READ 160-180 | 120-180 | 00000.....10 | 400F, 420F, 440F |
| (302G) TIME G, READ 50-70 | 50-70<br>70-90 | 00000.....100<br>00000.....10 | 400G, 420G, 440G<br>400H, 420H, 440H |
| (302H) TIME H, WRITE 120-180 | 120-180 | 00000.....101 | 400F, 420F, 440F |
| (302I) TIME I, READ 70-90 | 50-90 | 00000.....100 | 400J, 420J, 440J |

FIG. 7

EFFICIENT CACHING SYSTEM

BACKGROUND

A computer system may copy data from a storage device into a cache memory. The computer system may reduce storage access times by servicing storage access requests from the faster cache memory. When the cache fills up, the computer system may invalidate some data from the cache memory and repopulate the cache memory with other data from the slower storage device.

The computer system may use different criteria for replacing data in the cache memory. For example, the computer system may use a least recently used (LRU) scheme that replaces data in least recently accessed cache lines with data recently accessed data from the storage device. In another example, the computer system may use a least frequently used (LFU) scheme that replaces data in the cache lines with the fewest number of accesses with the data recently accessed from the storage device. Some memory systems may use a combination of the LRU scheme and the LFU scheme. Derivative systems (such as ARC) have also been used to improve the effectiveness of caching in storage systems and provide resiliency against storage access patterns that cause undesirable replacement of data (thrashing of the cache).

The LRU scheme and/or the LFU scheme still may not provide the most efficient and/or effective replacement of data in the cache. For example, a first set of data may be invalidated in the cache while a second set of data in the cache remains valid. The computer system then may request the first set of data while the second set of data remains unused in the cache. The computer system may experience slower memory access times since the first set of data now has to be accessed from the slower storage device. Caching systems may track storage access patterns and predict which data will be accessed in the future and for how long that data will be relevant. However, tracking and predicting storage operations is computationally intensive and sometimes may not be possible. The ability to determine whether data should be cached and for how long is a desirable capability within a storage system.

BRIEF DESCRIPTION OF THE DRAWINGS

FIG. 7 depicts an example table showing how clusters are created and modified based on new storage operations.

DETAILED DESCRIPTION

Figure 1:
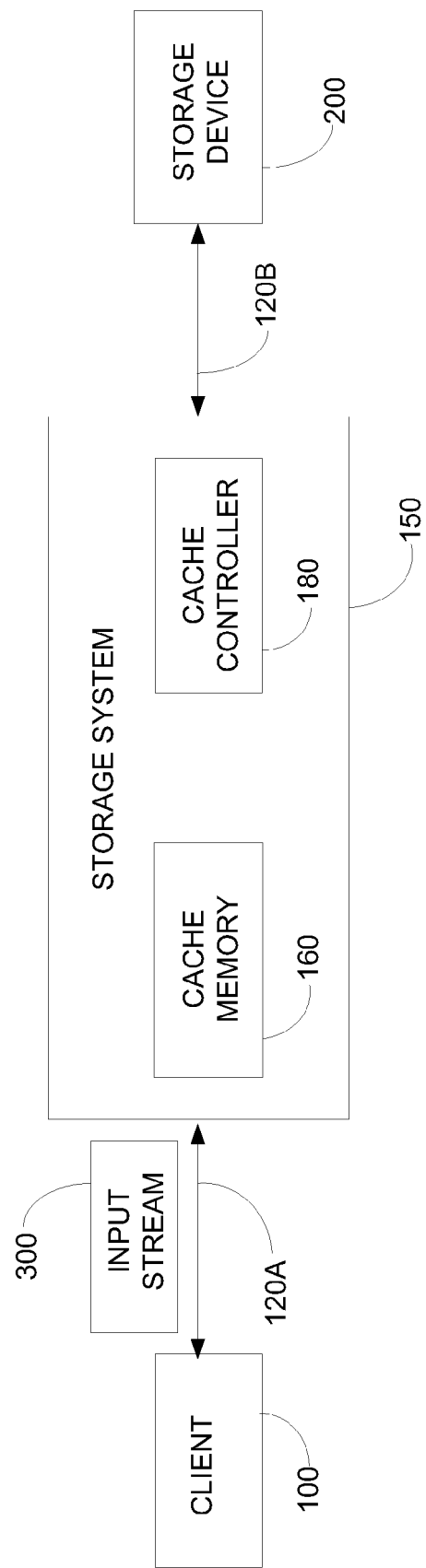
FIG. 1 depicts an example of a storage system.

FIG. 1 shows a storage system 150 deployed between a client 100 and a storage device 200. Client 100, storage system 150, and/or storage device 200 may be directly connected together, or connected to each other through a network or fabric. In one example, client 100, storage system 150, and/or storage device 200 are coupled to each other via wired or wireless Internet connections 120.

Client 100 can be any device or application that writes and/or reads data to and from another device. For example, client 100 may comprise one or more servers, server applications, database applications, routers, switches, client computers, personal computers, Personal Digital Assistants (PDA), smart phones, digital tablets, digital notebooks, or any other wired or wireless computing device and/or software that accesses data in storage device 200.

In another example, client 100 may comprise a stand-alone appliance, device, or blade, and the storage device 200 may comprise a stand-alone storage array. In another example, client 100 may be a processor or software application in a personal computer or server that accesses one or more storage devices 200 over an internal or external data bus. In a further example, client 100 may be a gateway or proxy device providing access to storage 200 to one or more stand-alone appliances, devices or electronic entities. Said access may be provided by cabled connection, wireless connections or other means of communication with client 100.

Storage device 200 may be any device that stores data accessed by another device, application, software, client, or the like, or any combination thereof. In some examples, storage device 200 may contain storage media such as solid state memory and/or storage disks. In one example, storage device 200 may contain multiple physical disks that may be referred to generally as a disk array.

Physical disks may exist locally within the same physical enclosure as storage system 150, within a same enclosure with storage devices 200, or may exist externally in a chassis connected to storage device 200 and/or storage system 150 through some interconnection mechanism.

In one example, physical disks in storage device 200 may be virtualized by storage system 150 as virtual disks. The virtual disks may comprise memory, buffers, registers, or the like, or any combination thereof and may provide an abstraction of physical disks in storage device 200. In one example, the virtual disks may be associated with different capacities and performance capabilities than the physical disks in storage device 200. In a further example, storage device 200 is a gateway or proxy device providing access to another storage device.

The virtual disks may present the physical disks in storage device 200 to client 100, receive an address from client 100, and provide an associated address for accessing physical disks in storage device 200. In one example, physical disks in storage device 200 and virtual disks in storage system 150 may be identical in size and configuration. In other examples, virtual disks in storage system 150 may consist of stripes of data or volumes of data that extend across multiple different physical disks in storage device 200.

Different communication protocols can be used over connection 120A between client 100 and storage system 150, and connection 120B between storage system 150 and storage device 200. Example protocols may include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE), Internet protocols, Ethernet protocols, File Transfer Protocol (FTP), or the like, or any combination thereof. Connections 120A and 120B may use the same protocols or different protocols. Protocols used between client 100 and storage device 200 may include tunneled or encapsulated protocols to allow communication over multiple physical interfaces such as wired and wireless interfaces.

Client 100 may send an input stream 300 to storage device 200 though storage system 150. Input stream 300 may comprise storage operations, such as write operations and read operations that identify associated storage addresses. Input stream 300 also may include other storage control operations, such as reserve operations, trim operations, or the like. Interactions between client 100 and storage system 150 and storage device 200 may be normalized to block-level operations such as "reads" and "writes" of an arbitrary number of blocks.

Storage system 150 may include a cache memory 160 configured to accelerate accesses associated with storage device 200. Cache memory 160 may store copies of data from the physical discs in storage device 200. Cache memory 160 may comprise any memory devices that provide relatively faster data access than the physical disks in storage device 200. For example, cache memory 160 may comprise any combination of Dynamic Random Access Memory (DRAM) and/or Flash memory. However, other types of media with superior performance to storage device 200 could also be used. The physical disks in storage device 200 may be any combination of flash memory, rotating disk devices, integrated memory devices, or the like, or any combination thereof.

One or more processing devices and/or software in storage system 150 may operate as a cache controller 180 and control cache memory 160. For example, during a read operation received in input stream 300 from client 100, cache controller 180 may read data from storage device 200, supply the data to client 100, and store the data in cache memory 160.

If subsequent read operations from client 100 request the same data, storage system 150 returns the data directly from cache memory 160 instead of from storage device 200. Such a direct return is referred to as a "cache hit" and reduces the read access time for providing data to client 100. For example, a memory access to storage device 200 may take several milliseconds (ms) while a memory access to cache memory 160 may be in the order of microseconds (μs).

Figure 2:
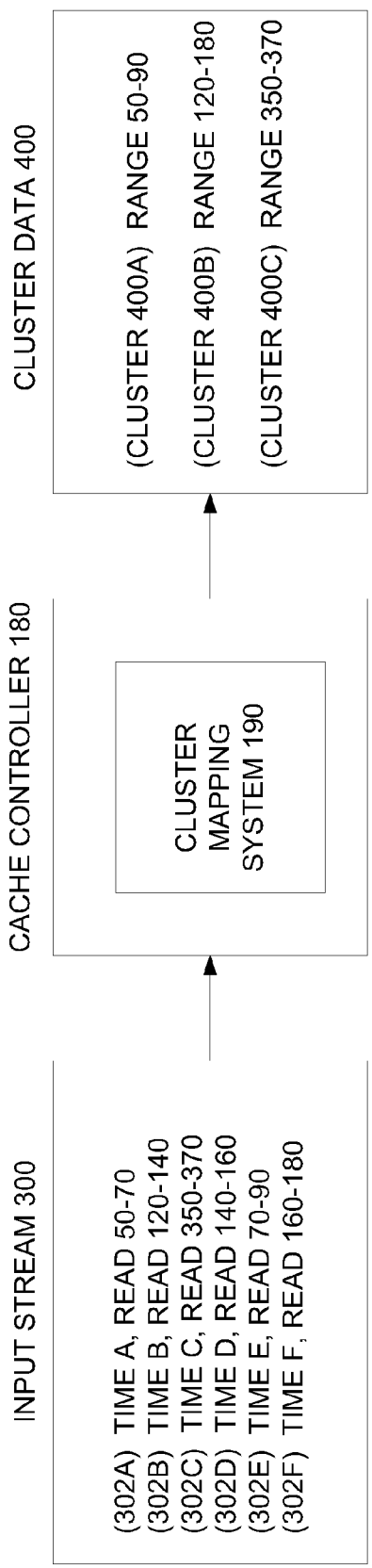
FIG. 2 depicts an example of a cache controller used by a storage system.

FIG. 2 depicts an example of an input stream 300 sent from client 100 in FIG. 1 to storage device 200 in FIG. 1. In this example, input stream 300 includes a series of storage operations 302A-302F. Storage operation 302A comprises a read at time A for address range 50-70. In one example, the address range may identify multiple blocks of data, such as a number of 4K blocks of data. However, the client device may use any addressing scheme to identify any range of data addresses.

Storage operation 302B at time B reads data for address range 120-140, storage operation 302C at time C reads data for address range 350-370, storage operation 302D reads data at time D for address range 140-160, storage operation 302E at time E reads data for address range 70-90, and storage operation 302F at time F reads data for address range 160-180.

A cluster mapping system 190 in cache controller 180 generates cluster data 400 based on the storage operations 302 identified in input stream 300. For explanation purposes cluster data 400 is referred to below as a cluster. It should be understood that different clustering algorithms may be used by cluster mapping system 190 and the following describes just one example clustering algorithm.

Other examples of clustering algorithms that may be used by cluster mapping system 190 are described in U.S. patent application Ser. No. 12/889,732 filed on Sep. 24, 2010, now U.S. Pat. No. 8,443,150 issued on May 14, 2013; U.S. patent application Ser. No. 12/814,438 filed on Jun. 12, 2010; U.S. patent application Ser. No. 12/605,119 filed on Oct. 23, 2009, now U.S. Pat. No. 8,214,599 issued on Jul. 3, 2012; U.S. patent application Ser. No. 12/605,160 filed Oct. 23, 2009, now U.S. Pat. No. 8,214,608 issued on Jul. 3, 2012; and U.S. patent application Ser. No. 12/684,387 filed Jan. 8, 2010 which are all herein incorporated by reference in their entireties. One objective of the cluster mapping system is to minimize the memory requirements of recording storage accesses such that multiple storage accesses, when appropriate, can be recorded and characterized by a single cluster as opposed to requiring individual records for each storage access.

In this example, cluster mapping system 190 identifies related memory address ranges with similar memory access patterns. For example, at first time A the client performs read operation 302A to an address range of 50-70. At time E the client performs read operation 302E to block address range 70-90. Read operations 302A and 302E each comprise a single read operation and form a contiguous address range 50-90.

Address 70 exists in both read operation 302A and 302E. However, it should be understood that this is shown for explanation purposes and actually may represent two address blocks where the beginning of the address range for read operation 302E starts at a next contiguous block address location after the end of the address range for read operation 302A. Since read operations 302A and 302E form a contiguous access range with a same number of read operations, cache controller 180 generates a cluster 402A having an address range of 50-90.

Read operation 302B at time B reads address range 120-140. At time D read operation 302D reads address range 140-160, and at time F read operation 302F reads address range 160-180. Cluster mapping system 190 determines that the data associated with each of the three read operations 302B, 302D, and 302F has only been read once and that the three address ranges form a contiguous address range of 120-180.

Accordingly, cluster mapping system 190 generates a cluster 400B for address range 120-180 with an access history of a single read operation. In this example, cluster mapping system 190 also generates a third cluster 400C for address range 350-370 corresponding to read operation 302C.

Figure 3:
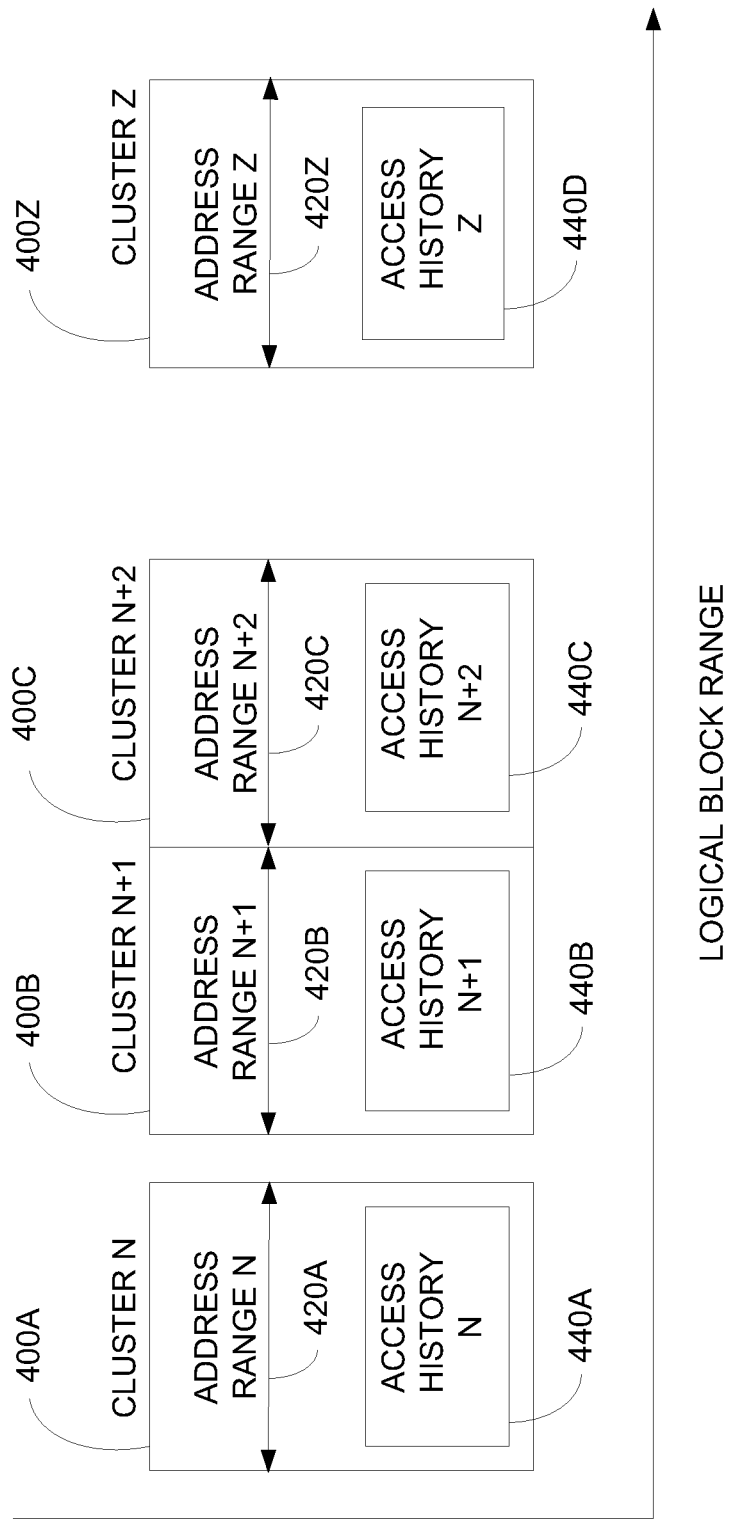
FIG. 3 depicts an example of cluster data generated by a cluster mapping system.

FIG. 3 depicts an example of how the cluster mapping system may generate access histories for each cluster 400. As mentioned above, clusters are associated with a logical block address range. Each cluster 400 may identify an address range 420 and also identify an access history 440. In the example described above in FIG. 2, cluster 400A has an address range 420A of 50-90, cluster 400B has an address range 420B of 120-180, and cluster 400C has an address range 420C of 350-370. Up until time F in FIG. 2, access histories 440A, 440B, and 440C for clusters 400A, 400B, and 400C, respectively, each may identify a single read operation. In this manner, each cluster may record the aggregate history of a plurality of storage accesses in such a way that no relevant information regarding those accesses was lost through the cluster operations.

Figure 4:
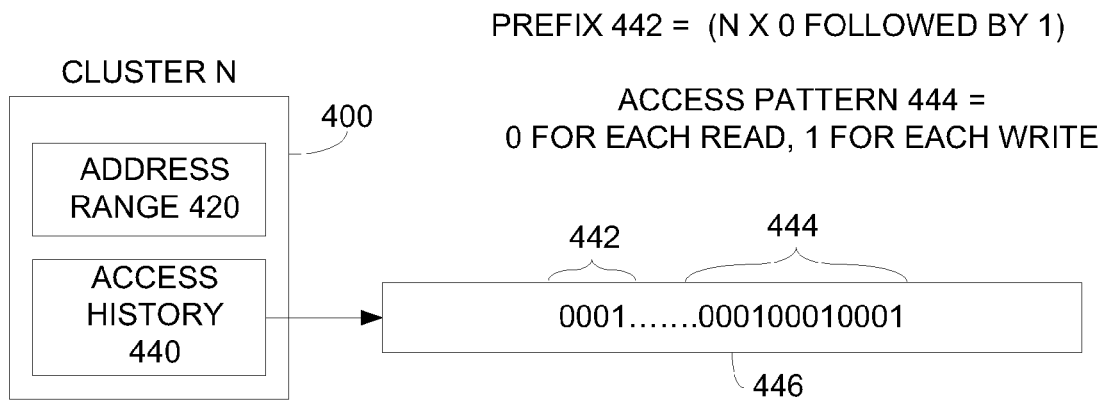
FIG. 4 depicts an example of an access history generated for a cluster.

FIG. 4 shows one example of how the cluster mapping system 190 may generate access history 440. Cluster mapping system 190 in FIG. 2 may track a large number of clusters 400 and associated access histories 440. Cluster mapping system 190 may use a bit pattern 446 to track access history 440 and reduce the memory and processing required for maintaining clusters 400.

Bit pattern 446 may comprise a prefix 442 and an access pattern 444. Access pattern 444 identifies a history of memory accesses for an associated cluster 400 and prefix 442 indicates a number of valid bits or length for access pattern 444.

Every bit in access pattern 444 may represent one storage operation. For example, the cluster mapping system may set bits in access pattern 444 to zero for read operations and set bits in access pattern 444 to one for write operations. For example, the cluster mapping system may generate an access pattern 01100 for a sequence of read, write, write, read, and read operations for a same cluster 400.

Prefix 442 validates the associated access pattern 444 for cluster 400. For example, the number of preceding zeros in prefix 442 may be variable and prefix 442 may initially comprise 32 bits. Each valid storage operation may shift prefix 442 and access pattern 444 one bit position to the left. For example, no valid storage operations may exist for cluster 400. Prefix 442 then may comprise thirty one 0 bits followed by a 1 bit. If a single write operation is identified for cluster 400, the prefix 1 bit is shifted one bit position to the left so that prefix 442 now comprises 30 zero bits followed by a 1 bit. A 1 bit is then added to access pattern 444. In this manner, prefix 442 allows for a variable length history of storage read and write operations.

The 1 bit in prefix 442 and the current access pattern 444 are both shifted one bit position to the left each time a new read or write operation is identified for cluster 400. The right most bit in access pattern 444 is then set to a 1 or 0 identifying the new read or write operation. For example, the cluster mapping system may generate bit pattern "000 . . . . 100" for the first two read operations for cluster 400. Prefix 442 comprises the left most 30 bits "000 . . . 1" indicating a two bit access history 444 of two consecutive read operations "00". Thus, N−1 memory accesses can be identified in N bits of memory space.

In another example, a fixed number of bits in bit pattern 446 may be assigned to prefix 442 and operate as a counter. For example, the five left most bits in bit pattern 446 may identify how many of the remaining 27 bits are associated with valid storage operations for cluster 400. For example, a 5 bit prefix 442 of 00110 may indicate that the 6 right most bits comprise the current access history 440.

The use of a prefix indicating length allows for an arbitrary number of storage operations to be recorded, preserving the temporal ordering of these operations, utilizing only one bit of memory per operation.

Figure 5:
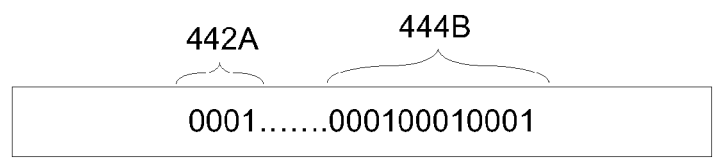
FIG. 5 depicts an example of how the history pattern may be updated for a new storage operation.
Figure 5:
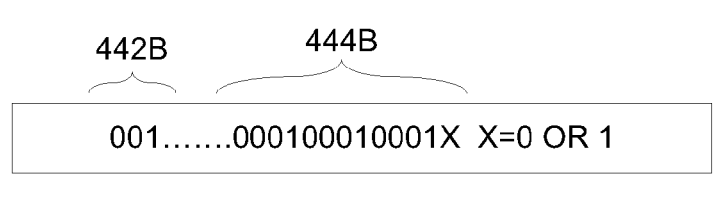

FIG. 5 shows in further detail how the cluster mapping system generates and updates access history 440. Assuming a 32 bit access history, an existing access history 440A indicates prefix 442A has 4 bits indicating access pattern 444A has 27 bits. Thus, cluster 400 currently has an access history 440A of 27 read and write operations.

The cluster mapping system generates a new access history 440B in response to a new storage operation X, such as a new read operation 0 or a new write operation 1. Bits from existing access history 440A are all shifted one bit position to the left and the new storage operation X is identified in the right most bit of access pattern 444B. New access history 440B now comprises a prefix 442B with 3 bits indicating access pattern 444B now includes the access history for 28 read and write operations.

Assuming a 32 bit access history, the left most bit in prefix 442 may be shifted out if the sequence of memory accesses for a particular cluster extends beyond thirty two. A logical 1 value may be logically OR'd with the left most bit in access history 440 to indicate the validity of the latest 31 storage operations associated with access pattern 444.

Thus, prefix 442 operates as a length identifier or counter for access pattern 444. The access pattern 444 then provides a series of bits that indicate a pattern of storage operations associated with cluster 400.

Figure 6:
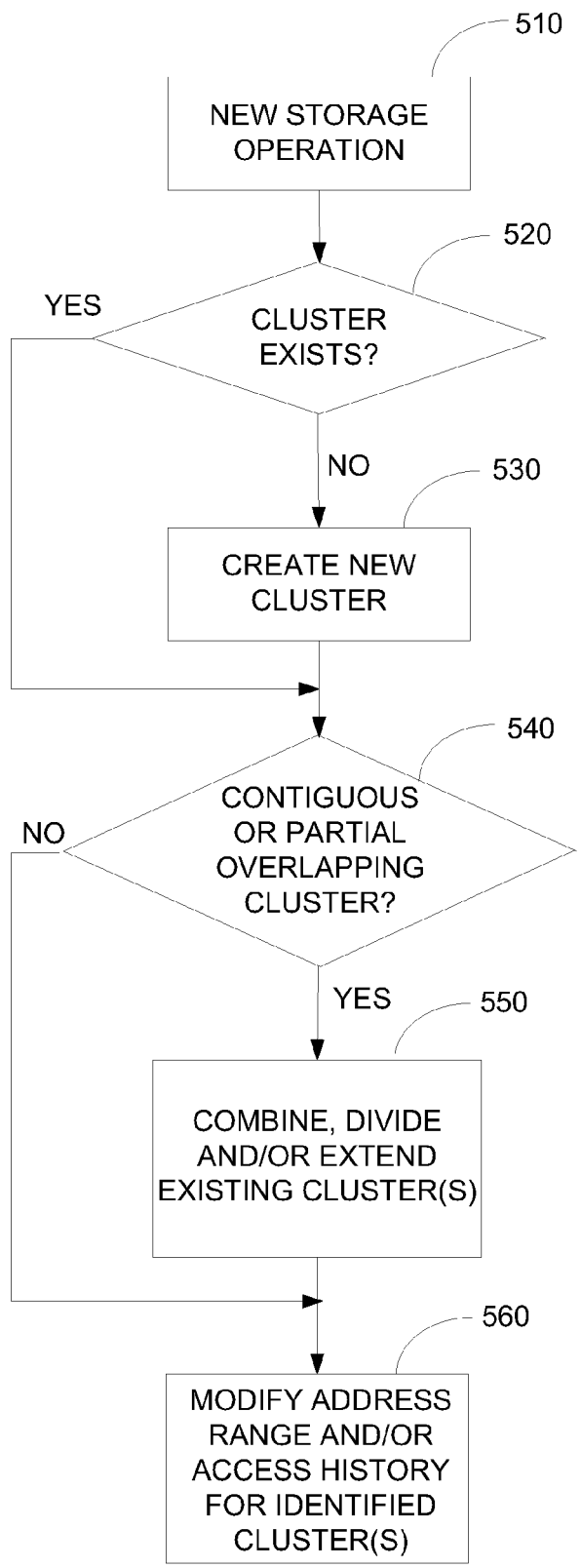
FIG. 6 depicts an example process for generating clusters.

FIG. 6 depicts an example process for generating clusters based on storage operations. In operation 510, the cluster mapping system may detect a new storage operation sent by the client. In operation 520, the cluster mapping system compares the address range of the new storage operation with the address ranges of existing clusters. A new cluster is created in operation 530 if no existing cluster is identified in operation 520. For example, the cluster mapping system may determine no cluster exists when an address range of the new storage operation does not overlap or extend the address range of an existing cluster.

Operation 540 identifies a relationship between the new storage operation and an existing cluster. For example, the new storage operation may extend a contiguous address range for an existing cluster. In another example, the address range of the new storage operation may partially or completely overlap the address range of one or more existing clusters.

In operation 550, the cluster mapping system may combine, divide, or extend existing clusters based on the type of new storage operation and the address range of the new storage operation. For example, an existing cluster may have the address range of 200-400 and may have an access history of one read operation. The new storage operation may comprise a read operation for address range 400-500. In operation 550, the cluster mapping system may update the existing cluster to an address range of 200-500 and in operation 560 maintain the cluster access history as a single read operation. Extending an existing cluster alters the end point of the cluster with respect to the storage address space, but does not require additional memory for the cluster mapping system.

In another example, the cluster mapping system may combine existing clusters based on the new storage operation. For example, a first existing cluster may have an address range of 100-300 and may have an access history of read, read, write. A second existing cluster may have an address range of 300-500 and have an access history of read, read. The new storage operation may be a write to address range 300-500.

In operation 550, the cluster mapping system determines that the first existing cluster and the second existing cluster now form a contiguous address range of 100-500 with a same access history of read, read, write. In operation 550, the cluster mapping system combines the first cluster and the second cluster into a single cluster with an address 100-500 and in operation 560 creates an access history of 001 (read, read, write).

When combining clusters, the cluster mapping system may recover the memory associated with one of the previously existing two clusters. Although both previously existing clusters may represent a history of many storage operations, the combination into a single cluster does not lose historical information provided the access history of both these clusters is (now) the same. This ability to describe a storage access history with minimal memory requirement is an advantage of using a cluster mapping system.

In yet another example, the cluster mapping system may divide an existing cluster into multiple different clusters. For example, an existing cluster may have an access history of five consecutive read operations for an address range 100-400. This may be represented as access history 00000 . . . . 100000.

The cluster mapping system may receive a new read operation for address range 100-200. The cluster mapping system in operation 550 may divide the existing cluster into two separate clusters. In operation 560, the cluster mapping system may generate a first cluster with a first address range of 100-200 with an access history 00000 . . . . 1000000 indicating six consecutive read operations and generate a second cluster with the address range of 200-400 with an access history 00000 . . . . 100000 indicating five consecutive read operations.

FIG. 7 depicts additional examples of how the cluster mapping system may generate different clusters 400 based on input stream 300 received from the client. Time A represents a first storage operation 302A received by the storage system. The cluster mapping system generates a cluster 400A with an associated address range 50-70 (420A) and access history 00000 . . . . 10 (440A).

The cluster mapping system generates a second cluster 400B in response to receiving read operation 302B at time B. Cluster 400B has an address range 420B of 120-140 and an access history 440B of 00000 . . . 10. Cluster 400C is generated at time C in response to read operation 302C. Cluster 400B is expanded into cluster 400D with address range 420D of 120-160 and access history 440D of 00000 . . . 10 in response to read operation 302D at time D.

Cluster 400A is expanded into cluster 400E with address range 420E of 50-90 and access history 440E of 00000 . . . 10 in response to read operation 302E at time E.

Cluster 400D is expanded into cluster 400F with address range 420F of 120-180 and access history 440F of 00000 . . . 10 in response to read operation 302F at time F.

Cluster 400E is divided into clusters 400G and 400H in response to read operation 302G at time G. Cluster 400G has an address range 420G of 50-70 and access history 440G of 00000 . . . 100. Cluster 400H has an address range 420H of 70-90 and access history 440H of 00000 . . . 10.

Cluster 400F is updated with access history 440F of 00000 . . . 101 in response to write operation 302H at time H. Clusters 400G and 400H are recombined into a single cluster 400J in response to read operation 302I at time I. Cluster 400J has an address range 420J of 50-90 with access history 440J of 00000 . . . 100.

Figure 8:
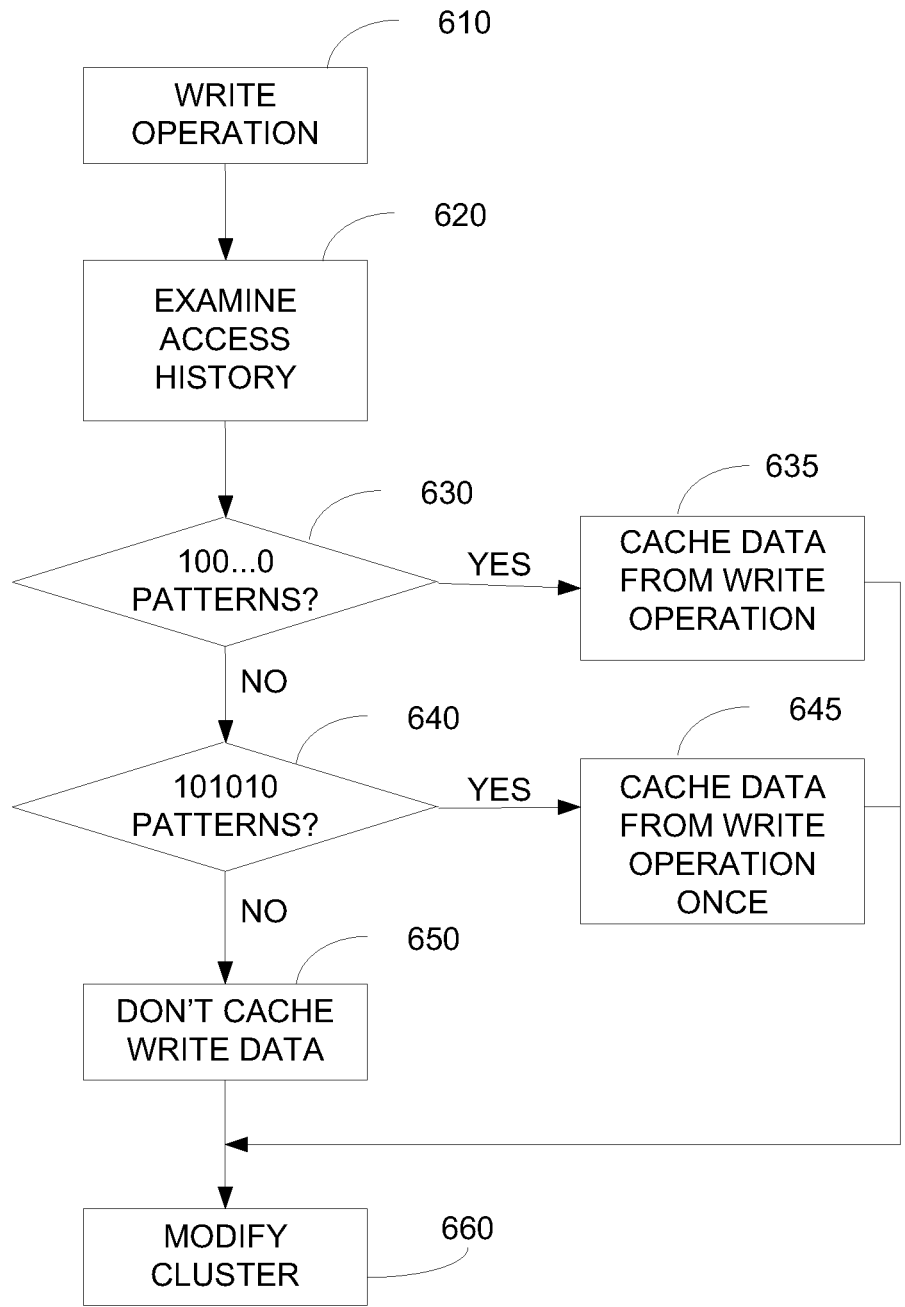
FIG. 8 depicts an example process for making caching decisions based on a write operation and a cluster access history.

FIG. 8 depicts one example process for making caching decisions based on the cluster access histories. In this example, the cache controller receives a write operation from the client in operation 610. In operation 620, the cache controller searches for a corresponding cluster with an associated address range. The cache controller then examines the access history for the identified cluster.

Operation 630 identifies a matching cluster with an access pattern of 1 bit followed by a number of 0 bits. The access pattern in operation 630 indicates a write operation followed by a number of read operations. Based on the access pattern, the cache controller predicts the data in the new write operation will be read a number of times. Accordingly, the cache controller in operation 635 may store the data contained in the write operation in the cache memory.

Operation 640 identifies an access pattern of 1010101010 for the matching cluster. The access pattern indicates a write operation followed by a read operation, then another write operation followed by another read operation, etc. The access pattern in operation 640 indicates the data in the new write operation should be cached. The access pattern also indicates that after a next read operation to the cluster, the cached data should be invalidated or written over. Accordingly, the cache controller in operation 645 may cache the data from the new write operation until an additional read operation is received for the cluster. The cache controller then may invalidate or write over the data in the cache memory.

Operation 650 may identify other access patterns, such as an access pattern 11111111. This access pattern indicates the cluster mostly receives write operations. In other words, the cluster is rarely read. In this example, the cache controller in operation 650 does not cache the write data.

The cache controller in operation 660 modifies the identified cluster(s) as described above. For example, the access history for the cluster may be updated to reflect the new write in operation 610. Based on the write identified in operation 610, the cache controller also may extend the cluster address range, combine clusters, divide clusters, or perform other clustering operations.

Figure 9:
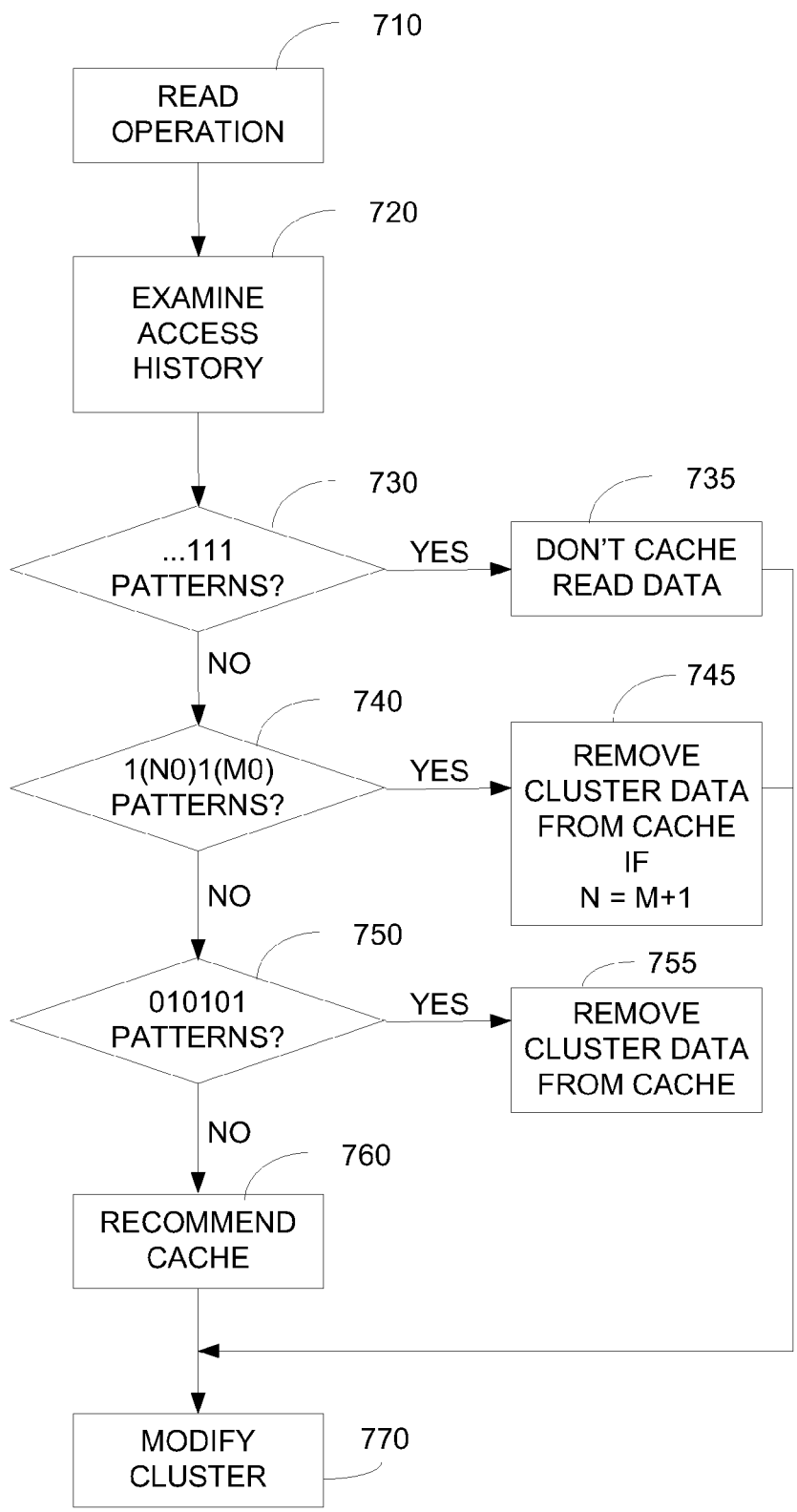
FIG. 9 depicts an example process for making caching decisions based on a read operation and a cluster access history.

FIG. 9 depicts an example caching process based on read operations. In operation 710 the cache controller identifies a read operation for a particular address range. In operation 720, the cache controller identifies the cluster corresponding to the address range and examines the associated access history.

The cache controller in operation 730 may detect an access history of 111111 indicating a series of repeated write operations. The new read operation appears to be a deviation from the primary pattern of write operations. However, the new read operation may not be considered enough of a deviation from the long history of repeated write operations. Accordingly, the storage system in operation 735 may read the data associated with the read operation from the storage device, supply the data to the client, but not cache the read data.

The cache controller in operation 740 may detect an access history of 1(N×0)1(M×0) or 1 followed by N zeros, followed by 1, followed by M zeros. This indicates an access pattern of a write operation followed by N number of reads then another write operation followed by M number of reads. Thus, after a write operation is detected, there is a high likelihood that the write data will be read for some number of reads.

In this example, the cache controller stores the data from a write operation in cache memory in all cases and maintains the cached data for a read as long as a current string M of read operations is less than N. The cache controller then invalidates or writes over the cached data in operation 745 when the new read in operation 710 plus the latest string of read operations (M) equals the prior string of read operations N. In this case, the history pattern indicated a high likelihood that the next operation will be a write, rendering the currently cached read data useless.

For example, the cluster access history may comprise 10000100001000 representing a write, four reads, a write, four reads, a write, and three reads. The new read in operation 710 may increase the current string of read operations to the previously observed series of 4 read operations. The cache controller in operation 745 then invalidates or writes over the cluster data previously stored in the cache memory subsequent to utilizing said data for the read request. Proactively removing the cluster data from the cache memory may substantially improve cache performance.

Operation 750 may detect an access pattern of 01010101 identifying multiple write operations each followed by a read operation. This access pattern indicates that after the new read in operation 710, the cluster data will likely be rewritten. Accordingly, the cache controller invalidates the data previously stored in the cache memory. In one example, the cache controller may invalidate the data only when operation 640 in FIG. 8 previously recommended caching the cluster data for only one read operation.

If no other access patterns are identified, operation 760 may default to caching the data associated with the new read operation. The cache controller in operation 770 modifies the identified cluster(s) as described above. For example, the access history for the cluster may be updated to reflect the new read operation.

In one example, the cache operations described in FIGS. 8 and 9 may be performed by a processor based on a caching algorithm. For example, the caching algorithm may cache data based on detection of any of the access patterns described above.

In another example, the cache controller may use a look up table (LUT) that compares entries with some subset of bits from the access history. For example, the lookup table may be 8 bits wide. The last 7 bits of the access history plus the current storage operation could be compared with the entries in the LUT. This would allow detection of 256 possible access patterns. Each LUT entry could then be associated with an associated caching operation, such as cache, don't cache, invalidate, etc. The cache controller could also use a hybrid software algorithm and LUT. For example, the LUT may be used for cluster access histories of 8 or fewer bits and the caching software algorithm may be used for cluster access histories of more than 8 bits.

In yet another example, the LUT may include caching instructions for certain matching access patterns that direct the caching software to make the caching decision. For example, the LUT may direct the cache software to make caching decisions for an access pattern 00000000 indicating more than eight consecutive reads. The LUT may be programmed to take into account other factors when making cache decisions, such as caching based on read or write size.

The LUT may also be programmed dynamically using feedback from performance analysis. In one example of such feedback, software analyzes the prevalence of repeated access patterns among the access histories of all clusters to assign confidence levels to the caching predictions based on different access patterns. It will be evident to those skilled in the art that the present invention enables a wide range of sophisticated analysis based on access pattern history beyond those examples described herein.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. An apparatus, comprising:
logic circuitry configured to generate cluster data identifying an address range and storage access history for an associated cluster, wherein the storage access history comprises:
an access pattern identifying an ordered series of storage operations associated with the cluster; and
a length identifier identify a length of the access pattern.

2. The apparatus of claim 1, wherein the access pattern comprises bits corresponding to a series and order of read and write operations.

3. The apparatus of claim 2, wherein the length identifier comprises a first portion of the bits identifying which of a second portion of bits are associated with the read and write operations.

4. The apparatus of claim 1, wherein the logic circuitry is further configured to:
identify a first one of the storage operations;
assign a value to a bit in the length identifier to indicate the access pattern as valid; and
assign a value to a bit in the access pattern to identify the first one of the storage operations as one of a read operation or a write operation.

5. The apparatus of claim 4 wherein the logic circuitry is further configured to:
identify a second one of the storage operations;
shift the bit in the length identifier and the bit in the access pattern to indicate an additional storage operation; and
assign a value to an additional bit in the access pattern to identify the second one of the storage operations as one of a read operation or a write operation.

6. The apparatus of claim 1, wherein the access pattern comprises a series of bits and the length identifier comprises a counter that identifies a number of the series of bits that represent the storage access history for the cluster.

7. The apparatus of claim 1, wherein the logic circuitry is configured to:
identify a caching condition where a sequence of bits in the access pattern indicate a history of write operations each followed by multiple read operations;
detect a new write operation; and
cache data associated with the new write operation in a cache memory in response to the caching condition.

8. The apparatus of claim 1, wherein the logic circuitry is configured to:
identify a caching condition where a series of bits in the access pattern indicate a history of write operations each followed by a single read operation;
detect a new write operation;
cache data associated with the new write operation in a cache memory in response to identifying the caching condition; and
invalidate or overwrite the data in the cache memory after a subsequent read operation.

9. The apparatus of claim 1, wherein the logic circuitry is configured to:
detect a new read operation;
identify a non-caching condition where a sequence of bits in the access pattern indicates a history of repeated sequential write operations; and
not cache data associated with the new read operation in response to identifying the non-caching condition.

10. The apparatus of claim 1, wherein the logic circuitry is configured to:
store data in cache memory;
receive a new read operation requesting the stored data;
identify a sequence of bits in the access pattern indicating a history of a first write operation followed by a first number of read operations and a second write operation followed by a second number of read operations;
update the second number of read operations in response to the new read operation; and
invalidate the stored data in the cache memory in response to detecting the updated second number of read operations equaling the first number of read operations.

11. A method, comprising:
tracking a history of storage operations for an address range;
generating a bit pattern identifying the history of storage operations;
receiving a new storage operation including an address associated with the address range; and
caching data associated with the new storage operation in a cache memory based on the bit pattern and the new storage operation;
invalidating data previously stored in the cache memory based on the bit pattern and the new storage operation; and
using a first portion of the bit pattern to identify a number of bits in the bit pattern identifying the history of storage operations.

12. The method of claim 11, further comprising shifting the bit pattern in response to receiving the new storage operation and setting a value for a last bit in the bit pattern to identify the new storage operation.

13. The method of claim 11, further comprising:
setting bits in the bit pattern to a first value to identify storage operations associated with read operations;
setting bits in the bit pattern to a second value to identify storage operations associated with a write operation; and
setting bits in the bit pattern to the first and second value in an order corresponding to a received order of the read and write operations.

14. The method of claim 11, further comprising using a counter to track a number of bits in the bit pattern identifying the history of storage operations.

15. The method of claim 11, further comprising:
identifying the new storage operation as a read operation; and
not caching the data based on the bit pattern indicating previous multiple back to back write operations.

16. The method of claim 11, further comprising:
identifying the new storage operation as a write operation; and
caching the data based on the bit pattern indicating a previous sequence of a write operation followed by multiple read operations.

17. The method of claim 11, further comprising:
identifying from the bit pattern write operations each followed by a single read operation;
storing data associated with a new write operation in the cache memory in response to identifying the new storage operation as a write operation; and
invalidating data previously stored in the cache memory in response to identifying the new storage operation as a read operation.

18. The method of claim 11, further comprising:
identifying the new storage operation as a read operation;
identifying from the bit pattern a first write operation followed by a first number of read operations and a second write operation followed by a second number of read operations; and invalidating data previously stored in the cache memory in response to detecting the read operation updating the second number of read operations to be equal to the first number of read operations.

19. A method, comprising:
detecting a first storage operation having a first address range;
generating a cluster address range and a cluster bit pattern from the first storage operation;
detecting a second storage operation with a second address range associated with the cluster address range; and
updating the cluster address range and/or the cluster bit pattern based on the second storage operation.

20. The method of claim 19, further comprising:
identifying the second address range as including a first address portion not overlapping the cluster address range and including a second address portion overlapping the cluster address range;
changing the cluster address range to the first address portion;
generating an additional cluster bit pattern comprising the cluster bit pattern updated with the second storage operation; and
generating an additional cluster address range comprising the second address portion.

21. The method of claim 19, further comprising:
identifying the second storage operation as associated with a second cluster bit pattern and a second cluster address range extending contiguously from the cluster address range;
updating the second cluster bit pattern based on the second storage operation;
determining the updated second cluster bit pattern matches the cluster bit pattern; and
generating a new cluster address range that combines the cluster address range and the second cluster address range.

22. The method of claim 19, wherein the bit pattern comprises a series of bits identifying a sequence of storage operations and a prefix identifying which of the series of bits are associated with the sequence of storage operations.

\* \* \* \* \*